United States Patent
Jouanneau et al.

(10) Patent No.: US 9,610,652 B2
(45) Date of Patent: Apr. 4, 2017

(54) LASER NOZZLE HAVING AN EXTERNAL MOBILE ELEMENT MADE OF ELECTRICALLY INSULATING MATERIAL AND AN INSERT MADE OF ELECTRICALLY CONDUCTIVE MATERIAL

(71) Applicant: L'Air Liquide, Société Anonyme pour l'Etude et l'Exploitation des Procédés Georges Claude, Paris (FR)

(72) Inventors: Thomas Jouanneau, Grenoble (FR); Philippe Lefebvre, Meulan (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 131 days.

(21) Appl. No.: 14/441,645

(22) PCT Filed: Oct. 23, 2013

(86) PCT No.: PCT/FR2013/052534
§ 371 (c)(1),
(2) Date: May 8, 2015

(87) PCT Pub. No.: WO2014/072610
PCT Pub. Date: May 15, 2014

(65) Prior Publication Data
US 2015/0273628 A1    Oct. 1, 2015

(30) Foreign Application Priority Data

Nov. 9, 2012    (FR) ...................................... 12 60659

(51) Int. Cl.
*B23K 26/142*    (2014.01)
*B23K 26/14*    (2014.01)
(Continued)

(52) U.S. Cl.
CPC ........ *B23K 26/1476* (2013.01); *B23K 26/046* (2013.01); *B23K 26/048* (2013.01);
(Continued)

(58) Field of Classification Search
CPC ......... B23K 26/12; B23K 26/14; B23K 26/38
(Continued)

(56) References Cited

U.S. PATENT DOCUMENTS

| 4,031,351 A | 6/1977 | Martin |
| 5,500,504 A | 3/1996 | Jagiella et al. |

(Continued)

FOREIGN PATENT DOCUMENTS

| AT | 391 436 | 10/1990 |
| DE | 198 53 735 | 3/2000 |

(Continued)

OTHER PUBLICATIONS

French Search Report and Written Opinion for corresponding FR 1260659, Jul. 10, 2013.

(Continued)

*Primary Examiner* — Samuel M Heinrich
(74) *Attorney, Agent, or Firm* — Elwood L. Haynes

(57) ABSTRACT

The invention relates to a nozzle for laser cutting, comprising a nozzle body (1) comprising a first axial housing (5), a movable element (2) formed from an electrically insulating material and comprising a second axial housing (4), said movable element (2) being arranged in the first axial housing (5), and an elastic element (8) arranged in the first axial housing (5) between the nozzle body (1) and the movable element (2). According to the invention, the nozzle furthermore comprises an insert (3) comprising an axial passage (18) and a front portion (3*a*) forming a skirt that protrudes out of the second axial housing (4), said insert (3) being arranged in the second axial housing (4) of the movable element (2) and formed from an electrically conductive material. Associated laser head and apparatus. Laser cutting process employing such a nozzle.

13 Claims, 5 Drawing Sheets

(51) Int. Cl.
*B23K 26/38* (2014.01)
*B23K 26/04* (2014.01)
*B23K 26/046* (2014.01)

(52) U.S. Cl.
CPC ........ *B23K 26/142* (2015.10); *B23K 26/1464* (2013.01); *B23K 26/38* (2013.01)

(58) Field of Classification Search
USPC ....................................... 219/121.67, 121.84
See application file for complete search history.

(56) References Cited

U.S. PATENT DOCUMENTS

| | | | | |
|---|---|---|---|---|
| 5,938,954 | A * | 8/1999 | Onuma | ................ B23K 26/122 219/121.6 |
| 6,130,405 | A | 10/2000 | Loringer | |
| 6,822,187 | B1 * | 11/2004 | Hermann | ........... B23K 26/0884 219/121.63 |
| 7,759,602 | B2 * | 7/2010 | Mori | .................... B23K 26/142 219/121.63 |
| 8,716,620 | B2 * | 5/2014 | Swartzinski | ....... B23K 26/0884 219/121.6 |

FOREIGN PATENT DOCUMENTS

| | | |
|---|---|---|
| EP | 1 669 159 | 6/2006 |
| EP | 2 444 193 | 4/2012 |
| FR | 1 154 224 | 4/1958 |
| JP | S61 37393 | 2/1986 |
| JP | S62 6790 | 1/1987 |
| JP | S63 40695 | 2/1988 |
| JP | S63 108992 | 5/1988 |

OTHER PUBLICATIONS

International Search Report and Written Opinion for corresponding PCT/FR2013/052534, Jan. 21, 2014.

* cited by examiner

LASER NOZZLE HAVING AN EXTERNAL MOBILE ELEMENT MADE OF ELECTRICALLY INSULATING MATERIAL AND AN INSERT MADE OF ELECTRICALLY CONDUCTIVE MATERIAL

CROSS REFERENCE TO RELATED APPLICATIONS

This application is a 371 of International PCT Application PCT/FR2013/052534 filed Oct. 23, 2013 which claims priority to French Patent Application No. FR 1260659 filed Nov. 9, 2012, the entire contents of which are incorporated herein by reference.

BACKGROUND

The invention relates to a laser nozzle usable in laser beam cutting, having an internal movable element comprising a skirt that allows the cutting gas to be funneled into the cutting kerf, and furthermore being more able to withstand industrial use and easier to implement industrially.

Laser beam cutting requires the use of a nozzle, generally made of copper, that channels the gas and allows the laser beam to pass.

These nozzles typically have outlet orifice diameters comprised between 0.5 and 3 mm for a working distance comprised between 0.6 and 2 mm.

In order to enable cutting, it is necessary to use high pressures, in general several bar, in the focusing head in order to allow the gas to penetrate into the kerf and flushes out molten metal.

However, a large percentage of the gas used, typically between 50 and 90%, does not take part in the cutting process, i.e. in the expulsion of molten metal, because it is lost to the sides of the cutting kerf.

These gas losses are in fact due to the enormous difference between the flow cross-sectional area of the nozzle orifice and the size of the focal spot. Thus, by way of indication, the flow cross-sectional area of a nozzle with an outlet orifice of diameter equal to 1.5 mm is 25 times larger than the cross-sectional area of the focal spot created by the beam passing through this nozzle.

However, if an insufficient amount of gas penetrates into the kerf, cutting defects will be observed, in particular attached burrs and/or oxidation marks.

Attempting to solve this problem by decreasing the diameter of the orifice of the nozzle is not ideal because the risk is then taken that the laser beam will strike and deteriorate the interior of the nozzle. Decreasing the diameter of the orifice of the nozzle also decreases cutting quality and/or performance.

There are moreover a number of documents proposing various solutions that attempt to encourage gas to penetrate into the kerf, documents EP-A-1669159, JP-A-62006790, JP-A-61037393, JP-A-63108992, JP-A-63040695 and U.S Pat. No. 4,031,351 for example.

However, none of these solutions is truly ideal because they either have an architecture that is complicated to implement, are bulky relative to conventional nozzles and/or of limited effectiveness.

Document U.S. Pat. No. 4,031,351 in particular discloses a laser cutting nozzle comprising a movable element the end of which is pressed by a spring against the surface of the part to be cut in order to encourage the injection of the cutting gas into the kerf. Document DE 198 53 735 C1 also discloses a nozzle having a movable element, in which nozzle a spring tends to move the movable element in the direction of the part.

The major drawback of this solution resides in the fact that the force exerted by the spring in the direction of the sheet, added to the pressure of the cutting gas, causes the movable element to exert a substantial force on the sheet to be cut. There is therefore a risk that the sheet will be deformed, scratched or even dragged, as in general the sheet is simply placed on the table of the industrial cutting machine.

To remedy this drawback, it has been proposed in French patent application No. 1 154 224, filed 16 May 2011, to arrange a movable element in the body of a laser nozzle. This movable element is able to move axially in said body, in the direction of the surface of the sheet to be cut, under the effect of a gaseous pressure. As a result the movable element moves toward the upper surface of the sheet to be cut until it makes contact therewith. The movable element thus forms a skirt that channels and concentrates the cutting gas into the kerf, thereby forcing the gas to penetrate into the kerf and improving its effectiveness.

However, this solution continues to pose certain problems, especially in the context of industrial use.

Thus, industrial laser cutting machines employ capacitive distance sensing systems to ensure that the focusing head is moved at a constant distance above the sheet to be cut.

These systems use a capacitive effect to detect small variations in distance between two conductive elements forming a capacitor. The distance separating the two conductive elements is determined by measuring the electrical capacitance of this capacitor, which especially depends on the dielectric permittivity of the medium separating them.

Use of such a sensor system is especially described in document U.S. Pat. No. 6,130,405.

In a cutting machine equipped with a conventional laser nozzle, generally formed from an electrically conductive material such as copper, the capacitive sensor measures the electrical capacitance between the sheet and the flat end surface of the nozzle i.e. the surface located facing the sheet. The capacitive sensor is electrically connected to means for controlling the movement of the focusing head so as to adjust the height of the head if the electrical capacitance measured varies or stop the movement of the head if the nozzle and the sheet make contact.

This capacitive type of sensing system makes it possible to guarantee a cutting performance that is constant in terms of speed and cutting quality, by maintaining the focal point of the laser beam in a constant position relative to the surface of the sheet. It also makes it possible to stop the machine in the case where obstacles are present on the sheet.

It is therefore essential not to disrupt its operation.

However, the use of a laser nozzle having a movable element such as described in French patent application No. 1 154 224 is difficultly compatible with such a system.

Specifically, the movable element of the nozzle forms a skirt that makes contact with the sheet to be cut. In order to guarantee that this movable element is able to resist the heat given off by the cutting process and the spatter of molten metal, it may be formed from a metallic material such as copper, brass or analogous. However, the metal movable element then makes contact both with the sheet, i.e. it is at the same electrical potential as the latter, and with the internal walls of the nozzle body, generally itself also formed from an electrically conductive material. It is therefore necessary to deactivate the capacitive sensor in order to prevent the cutting machine from malfunctioning.

One solution that would permit operation of the capacitive sensor of the machine would be to use a movable element formed from an electrically insulating material. However, this solution is not ideal because electrically insulating materials are in general not very resistant to the large amount of heat given off by the cutting process and to spatter of molten metal and/or thermal shocks.

The problem to be addressed is therefore how to mitigate all or some of the aforementioned drawbacks, especially by providing a laser nozzle that, relative to existing solutions, has a greatly improved robustness and lifetime and is much easier to implement industrially, and that does not disrupt, or clearly less so than the prior art, the operation of capacitive distance sensing systems with which industrial cutting machines are equipped.

SUMMARY

The solution of the present invention is thus a laser nozzle comprising:
- a nozzle body comprising a first axial housing;
- a movable element formed from an electrically insulating material and comprising a second axial housing, said movable element being arranged in the first axial housing; and
- an elastic element arranged in the first axial housing, between the nozzle body and the movable element, characterized in that the nozzle furthermore comprises an insert comprising an axial passage and a front portion forming a skirt that protrudes out of the second axial housing, said insert being arranged in the second axial housing of the movable element and formed from an electrically conductive material.

Depending on the case, the nozzle of the invention may comprise one or more of the following technical features:
- the second axial housing of the movable element comprises a second outlet orifice located in a front face of the movable element, the insert being arranged in the second axial housing so that the front portion forming a skirt protrudes out of said second axial housing through the second outlet orifice.
- the first axial housing of the nozzle body comprises a first outlet orifice located in a front face of the nozzle body, the movable element being able to move translationally in the first axial housing of the nozzle body until the front portion forming a skirt of the insert protrudes out of said axial housing through the first outlet orifice of the front face of the nozzle body.
- the elastic element exerts an elastic return force on the movable element tending to oppose the translational movement of the movable element in the axial housing in the direction of the first outlet orifice.
- the movable element is able and designed to move translationally in the first axial housing in the direction of the first outlet orifice under the effect of a gaseous pressure exerted on said movable element and/or said insert.
- the nozzle body, the movable element and the insert are axisymmetric parts arranged coaxially to one another.
- the insert comprises an external peripheral wall the maximum section of which is smaller than the minimum section of the first axial housing.
- the second housing comprises at least one second internal shoulder, and the external peripheral wall of the insert furthermore comprises a back portion comprising a second abutment arranged facing said second internal shoulder.
- the movable element is able to move between a plurality of positions comprising:
    - a rest position in which the front portion of the insert is completely or almost completely retracted into the first axial housing of the nozzle body; and
    - a working position in which the skirt of the front portion of the insert completely or almost completely protrudes out of the first axial housing of the nozzle body, through the first outlet orifice.
- at least one sealing element is arranged between the nozzle body and the movable element, for example one or more O-rings.
- said at least one sealing element is arranged in a peripheral groove produced in the external peripheral wall of the movable element.

The invention also relates to a laser focusing head comprising at least one focusing optical element, for example one or more lenses or mirrors, especially a focusing lens and a collimating lens, characterized in that it furthermore comprises a laser nozzle according to the invention.

Moreover, the invention also relates to a laser apparatus comprising a laser generator, a laser focusing head and a laser beam guiding device connected to said laser generator and to said laser focusing head, characterized in that the laser focusing head is according to the invention.

Preferably, the generator or laser source is a $CO_2$, YAG, fiber or disk laser, preferably a fiber or disk laser and especially an ytterbium fiber laser source.

According to another aspect, the invention also relates to a laser beam cutting process, which employs a nozzle according to the invention, a laser focusing head according to the invention or an apparatus according to the invention.

BRIEF DESCRIPTION OF THE DRAWINGS

The invention will now be better understood by virtue of the following description given with reference to the appended figures, in which.

DESCRIPTION OF PREFERRED EMBODIMENTS

Figure 1A:
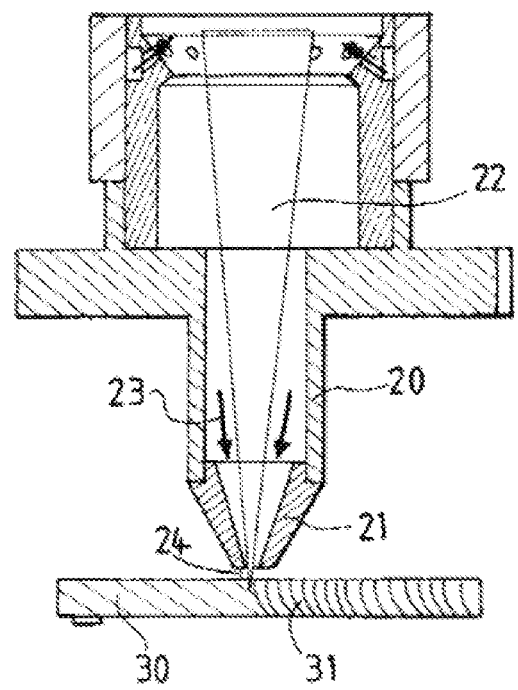
FIG. 1A schematically shows a focusing head of a conventional laser cutting apparatus.

FIG. 1A shows the focusing head 20 of a conventional laser cutting apparatus, to which a conventional laser nozzle 21 is fastened, said nozzle being passed through by a focused laser beam and by the assistance gas (arrow 23) that serves to expel metal melted by the beam out of the cutting kerf 31 formed by the beam 22 in the metal part 30 to be cut, for example a sheet of steel or stainless steel.

The assistance gas may be an active gas, such as oxygen, air, $CO_2$ or hydrogen, or an inert gas such as argon, nitrogen or helium, or a mixture of a number of these active and/or inert gases. The composition of the gas is especially chosen depending on the nature of the part to be cut.

The beam, which is made to impact the part, will melt, at this point of impact, the metal, which will be expelled under the part by the pressure of the assistance gas.

Figure 1B:
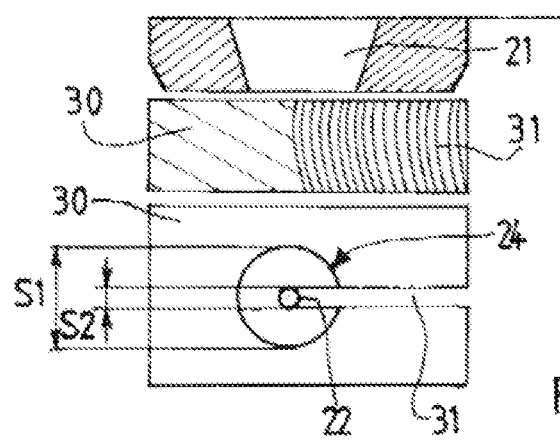
FIG. 1B schematically shows the size of the laser spot relative to the size of the nozzle orifice.

FIG. 1B shows the flow cross-sectional area S1 of the orifice 24 of the nozzle 21 relative to the size S2 of the focal spot of the beam 22. As may be seen, the area S1 is very much larger than the size S2 of the focal spot of the beam 22, leading, in conventional nozzles, to a high consumption of assistance gas, only a small proportion of which will serve to expel molten metal from the cutting kerf 31.

In order to considerably decrease gas consumption and the pressure required during cutting, French patent application No. 1 154 224 provides a laser nozzle suitable and designed for cutting with a laser beam with a lower gas flow and/or gas pressure, its particular nozzle architecture forcing a larger proportion of gas to penetrate into the kerf 31 and to expel effectively molten metal therefrom, whatever the laser power used and the wavelength of the beam.

Figure 2:
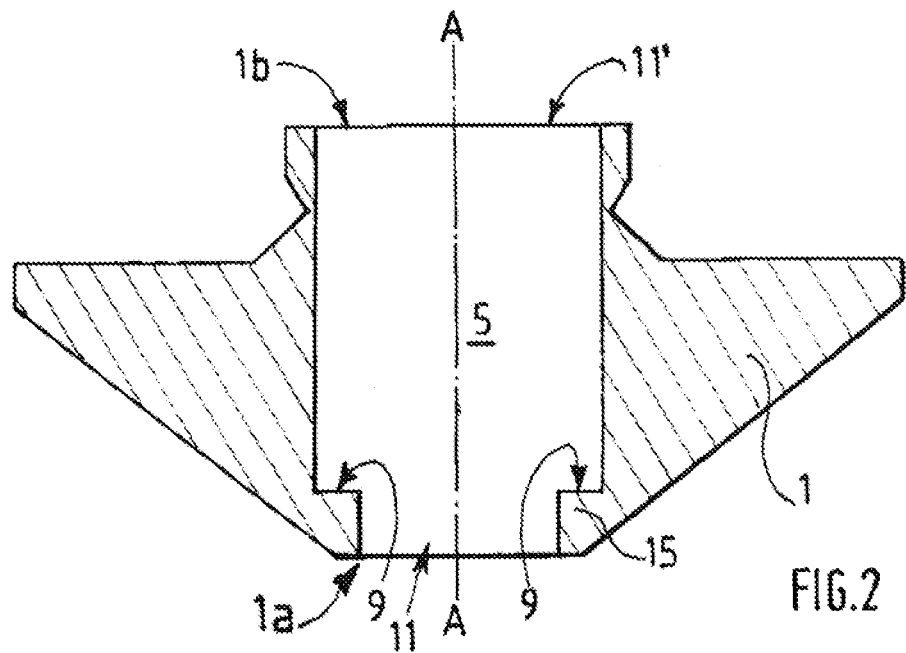
FIG. 2 is a schematic cross-sectional view of the body of a nozzle according to French patent application No. 1 154 224 and according to the present invention.
Figure 3:
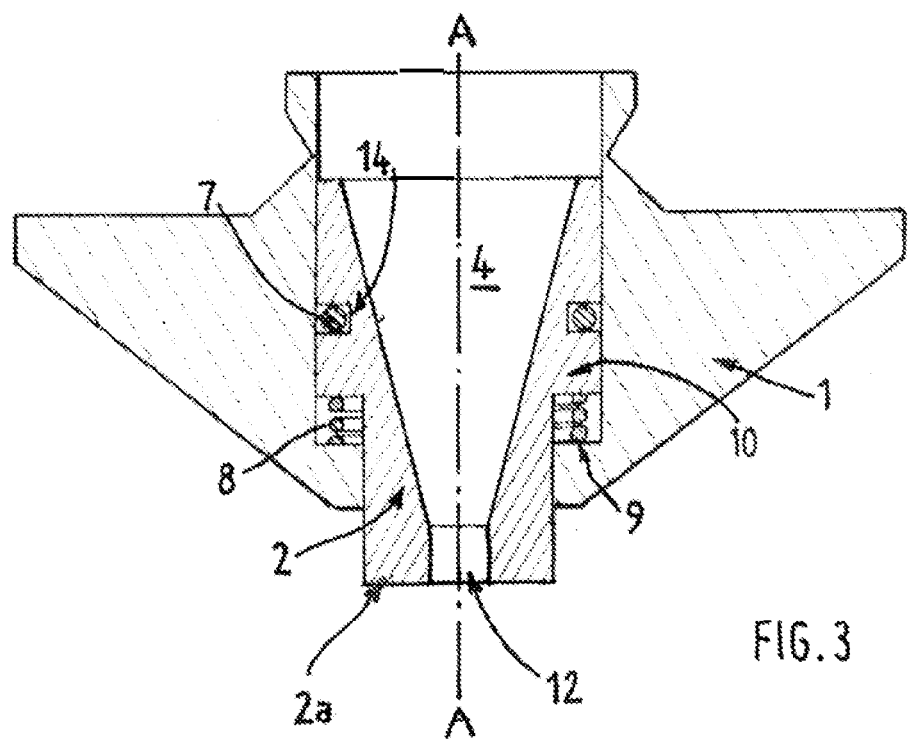
FIG. 3 is a schematic cross-sectional view of a nozzle according to French patent application No. 1 154 224.

According to document FR 1 154 224, the laser nozzle comprises at least two essential components, namely a nozzle body 1 interacting with a movable element 2 arranged movably inside the nozzle body 1, one embodiment of which is illustrated in FIGS. 2 and 3.

More precisely, as may be seen in FIG. 2, the nozzle body 1, which is formed from a conductive material, for example of copper or brass, is intended to be fastened to the laser focusing head 20 of the laser apparatus.

Advantageously, the nozzle body 1 is an axisymmetric part through which a first axial housing 5 of axis AA passes from side to side, said housing 5 extending from the back face 1b of the body 1 is far as the front face 1a of said body 1.

The first axial housing 5 emerges from the two, front and back respectively, faces 1a and 1b of the nozzle body 1. The back face 1b therefore contains a first inlet orifice 11', whereas the front face 1a contains a first outlet orifice 11 of the nozzle body 1, the first inlet and outlet orifices 11', 11 being coaxial and of axis AA.

This first axial housing 5 is in fact a void, for example of generally cylindrical shape, comprising a bottom 15 comprising a first internal shoulder 9 projecting radially toward the center of the housing 5, said first internal shoulder 9 being formed by a narrowing 15 of the cross section of the axial housing 5 level with the first outlet orifice 11 in the front face 1a of the nozzle body 1.

The nozzle of document FR 1 154 224 moreover comprises a movable element 2 that is inserted into the first housing 5 of the nozzle body 1, preferably coaxially to the body 1, as shown in FIG. 3. This movable element 2 is able and designed to move translationally along the axis AA inside the first housing 5 of the nozzle body 1.

The external peripheral wall of the movable element 2 comprises a first abutment 10 arranged facing said first internal shoulder 9, an elastic element 8 being positioned between the shoulder 9 and the abutment 10.

According to document FR 1 154 224, this movable element 2 comprises a front portion 2a forming a skirt 6 that is cylindrical in shape, i.e. tubular, arranged in the first axial housing 5 of the nozzle body 1 and comprising a second axial housing 4 with a second outlet orifice 12 that emerges from the front portion 3a forming said skirt 6.

During use of this nozzle, the laser beam 22 and the assistance gas 23 pass through the second axial housing 4 of the movable element 2 and exit via the second outlet orifice 12, which emerges from the front portion 2a forming said skirt 6.

The movable element 2 is movable axially relative to the body 1 of the nozzle along the axis AA. In fact, the movable element 2 moves under the effect of the pressure of the assistance gas 23, which is exerted on said movable element 2, thereby tending to push it in the direction of the part 30 to be cut.

Figures 6A, 6B:
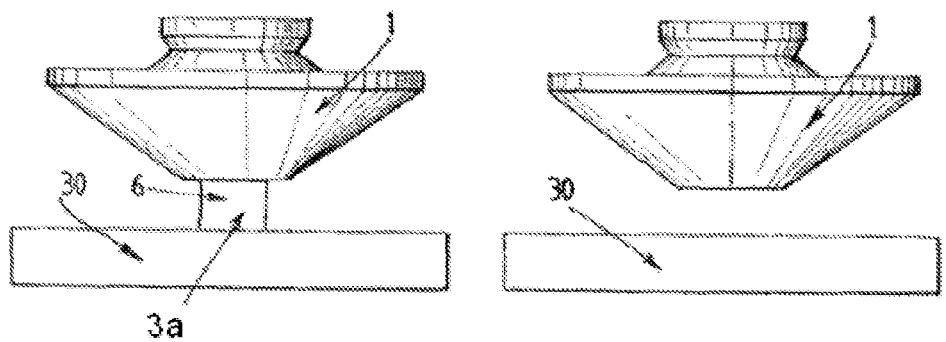
FIGS. 6A and 6B show the nozzle of the invention in its cutting configuration and in two different positions.

The translational movement along the axis AA of the movable element 2 will cause the skirt 6 to move closer to the upper surface 30 of the sheet to be cut, which will make contact with each other, as illustrated in FIG. 6A.

Thus, the gas will be channeled by the skirt 6 and concentrated on the laser spot and therefore the kerf, thereby greatly improving its effectiveness and the expulsion of metal.

An elastic element 8, such as a spring, is arranged in the first axial housing 5, between the nozzle body 1 and the movable element 2, so as to exert an elastic return force on the movable element 2 in a direction tending to distance it from the part to be cut.

According to the document FR 1 154 224, the movable element 2 is an axisymmetric part formed from a single block of a given material. This material may either be electrically insulating or electrically conductive.

However, none of these solutions is ideal, for the aforementioned reasons. On the one hand, electrically insulating materials, such as plastics, are not appropriate because they are not very resistant to the high temperatures, typically from 1000 to 2000° C., encountered in the vicinity of the cutting kerf and/or too abrasive as regards the surface of the sheet. On the other hand, using an electrically conductive material would require the capacitive sensor to be deactivated, thereby decreasing the reliability and performance of the cutting process.

In order to remedy this, the present invention provides a laser nozzle having an improved movable element.

According to the invention, a movable element 2 according to the invention, formed from an electrically insulating material, is arranged in the first axial housing 5 of a nozzle body 1 according to the prior art, such as shown in FIG. 2, said movable element 2 comprising a second axial housing 4.

Figure 4:
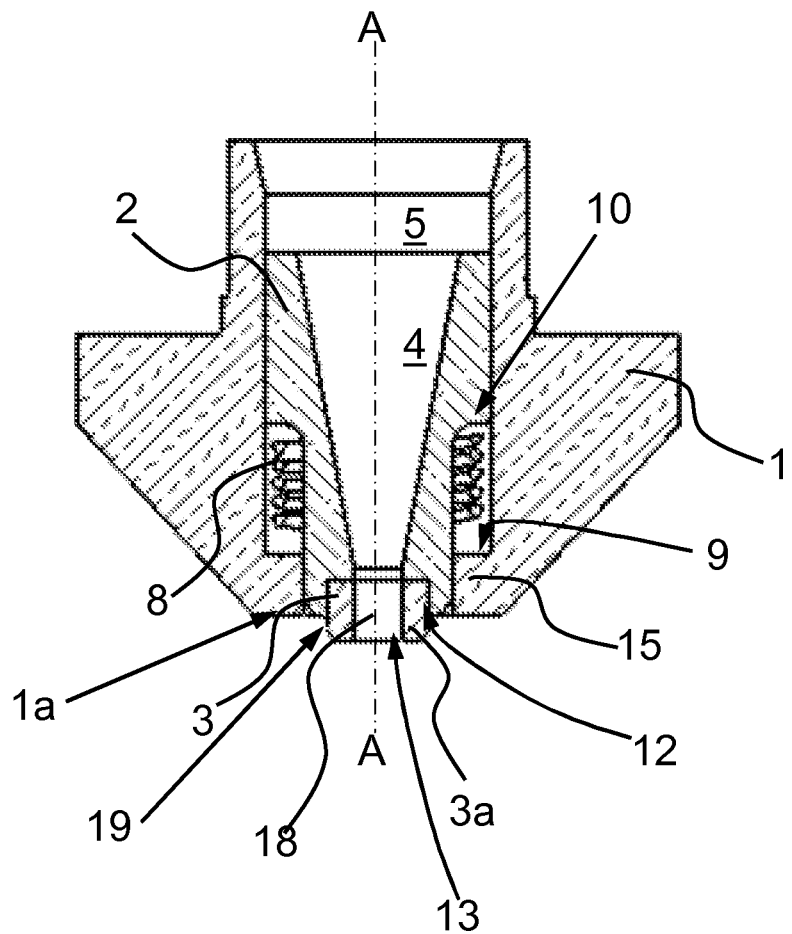
FIG. 4 shows a schematic cross-sectional view of a nozzle according to one embodiment of the invention.

Such a movable element 2 is schematically shown in FIG. 4, which illustrates one embodiment of the present invention. As may be seen, the nozzle according to the invention furthermore comprises an insert 3 comprising an axial passage 18 and a front portion 3a forming a skirt, said insert 3 being arranged in the second axial housing 4 of the movable element 2.

The insert 3 is formed from an electrically conductive material. Preferably, the insert 3 is formed from a metallic material, such as steel, bronze, a refractory steel, copper or brass, or an electrically conductive ceramic material, and preferably of an electrically conductive material that limits friction with the sheet in order to limit wear thereof.

The movable element 2 is formed from an electrically insulating material. The expression "electrically insulating material" is understood to mean a material that does not conduct electricity, i.e. a material that prevents the passage of electrical current between two electrically conductive elements. Preferably, the movable element 2 is formed from an electrically insulating technical ceramic, for example $Al_2O_3$, AlN, $ZrO_2$ or $Al_2TiO_5$, or a polymer, for example polyetheretherketone (PEEK) or Vespel®, or from an electrically insulating ceramic or Pyrex.

In fact, the nozzle according to the invention differs essentially in that its internal structure comprises two separate portions formed from materials of different nature. Thus, it makes it possible to select a suitable first material for the movable element and a suitable second material for the insert 3 comprising the front portion 3a forming a skirt.

The nozzle is therefore more resistant to the high temperatures encountered in the cutting process and to shocks since the front portion 3a forming a skirt may be formed from an electrically conductive material of adequate resistance. Furthermore, the fact that the skirt is formed from an electrically conductive material no longer disrupts operation of the capacitive sensor because the movable element 2 made of an insulating material makes it possible to prevent any electrical contact between the insert 3 and the nozzle body 1.

Advantageously, the second axial housing 4 of the movable element 2 comprises a second outlet orifice 12 located in a front face 2a of the movable element 2. The insert 3 is arranged in the second axial housing 4 so that the front portion 3a forming a skirt protrudes out of said second axial housing 4 through the second outlet orifice 12.

Preferably, the nozzle body 1, the movable element 2 and the insert 3 are axisymmetric parts each of unitary construction and arranged coaxially to one another. In other words, the axes of symmetry of the movable element 2 and of the insert (3) are aligned with the axis AA of the nozzle body 1.

The internal profile of the axial passage 18 of the insert 3 may be cylindrical, frustoconical or convergent-divergent in shape i.e. have a De Laval geometry, or any other geometry. The insert 3 comprises a third outlet orifice 13, preferably of circular cross-section, emerging downstream of the second outlet orifice 12 of the movable element 2. The diameter of the third outlet orifice 13 is preferably comprised between 0.5 and 5 mm and more preferably between 1 and 3.5 mm.

According to one preferred embodiment of the invention, the movable element 2 is able to move translationally in the first axial housing 5 of the nozzle body 1 until the front portion 3a forming a skirt of the insert 3 protrudes out of the first axial housing 5 through the first outlet orifice 11 of the front face 1a of the nozzle body 1.

The insert 3 may be securely fastened to the movable element 2 by adhesive bonding, forceful insertion or any other means of assembly in the second axial housing 4 of the movable element 2. In this case, the external peripheral wall of the insert 3 may be generally cylindrical in shape, as illustrated in FIG. 4.

Alternatively, the insert 3 may be translationally free in the second axial housing 4 of the movable element 2. In this case, the second housing 4 preferably comprises at least one second internal shoulder 16, and the external peripheral wall of the insert 3 furthermore comprises a back portion 3b comprising a second abutment 17 arranged facing said second internal shoulder 16.

Figure 5A:
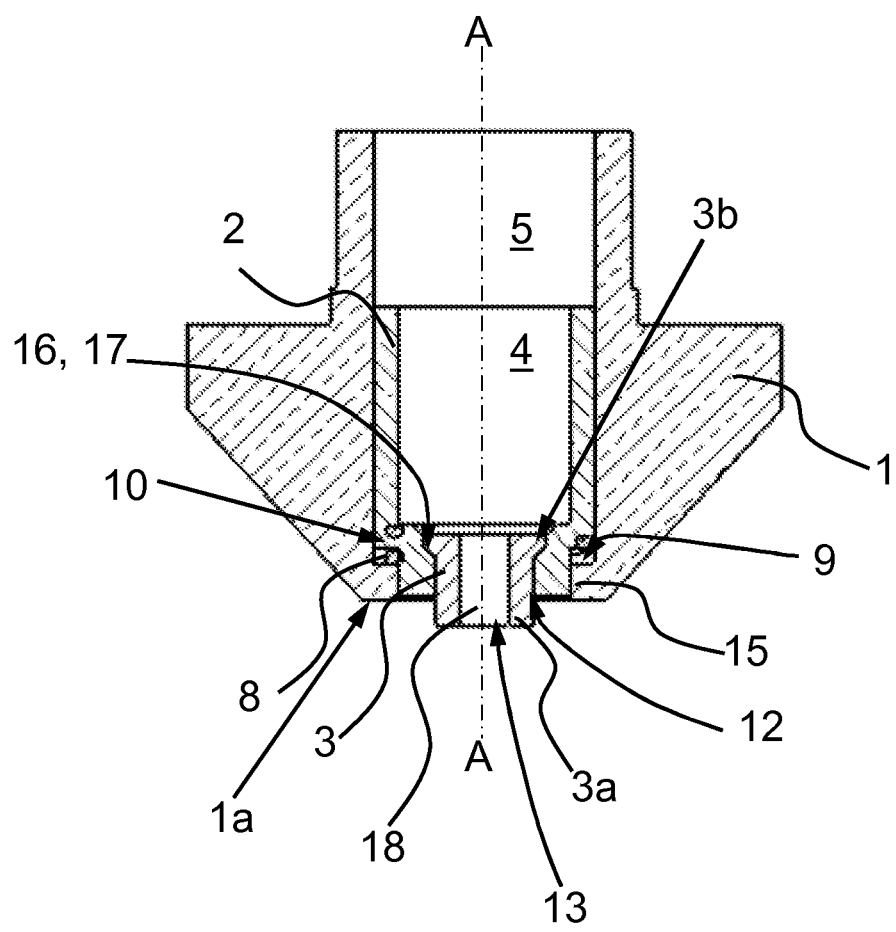
FIGS. 5A and 5B are schematic cross-sectional views of a nozzle according to another embodiment of the invention in two different positions.

This embodiment is illustrated in FIG. 5A. The insert 3 is then maintained in abutment 17 against the second internal shoulder 16 of the second axial housing 4. Preferably, the second internal shoulder 16 and the second abutment 17 are annular in shape and extend over all or some of the periphery of the movable element 2 and of the insert 3, respectively.

The second internal shoulder 16 is formed by a narrowing of the cross section of the second axial housing 4, projecting radially or obliquely toward the axis AA of the nozzle body 1. The shape of the second abutment 17 of the insert 3 is chosen to match the shape of the second internal shoulder 16, which may be flat, i.e. have a surface lying perpendicular to the axis AA, or oblique.

Advantageously, the second internal shoulder 16 is an oblique shoulder, such as shown in FIG. 5A, in order to permit a slight movement of the insert 3 in the second axial housing 4 in the case of thermal expansion of said insert 3.

In any case, when the movable element 2 moves translationally in the first housing 5, it carries with it the insert 3 until the front portion 3a protrudes through the first outlet orifice 11, i.e. downstream of the front face 1a of the nozzle body 1. The insert 3 thus moves in the same direction as the movable element 2, i.e. in the direction of the surface of the sheet to be cut when the latter is arranged under the nozzle of the invention.

Preferably, the movable element 2 is able and designed to move translationally in the first axial housing 5 in the direction of the first outlet orifice 11 under the effect of a gaseous pressure exerted on said movable element 2 and/or said insert 3. The insert 3 may advantageously be maintained in abutment 17 against the second internal shoulder 16 under the effect of said gaseous pressure.

In fact, the nozzle of the invention is intended to equip a focusing head mounted in an industrial laser cutting apparatus. This type of apparatus conventionally comprises a gas source connected to at least one line able and designed to supply cutting gas to the focusing head and more precisely to the internal volume of said head. The laser nozzle is fluidically connected to the focusing head so that the cutting gas supplying the focusing head is distributed to the laser nozzle according to the invention.

According to one embodiment of the invention, the movable element 2 of the nozzle is able and designed to move translationally in the first housing 5 of the nozzle body 1 when the gas source supplies the focusing head and the laser nozzle with gas. The cutting gas distributed in the focusing head then exerts a gaseous pressure on said movable element 2, which induces a movement of said element 2 in the first axial housing 5.

Figure 5B:
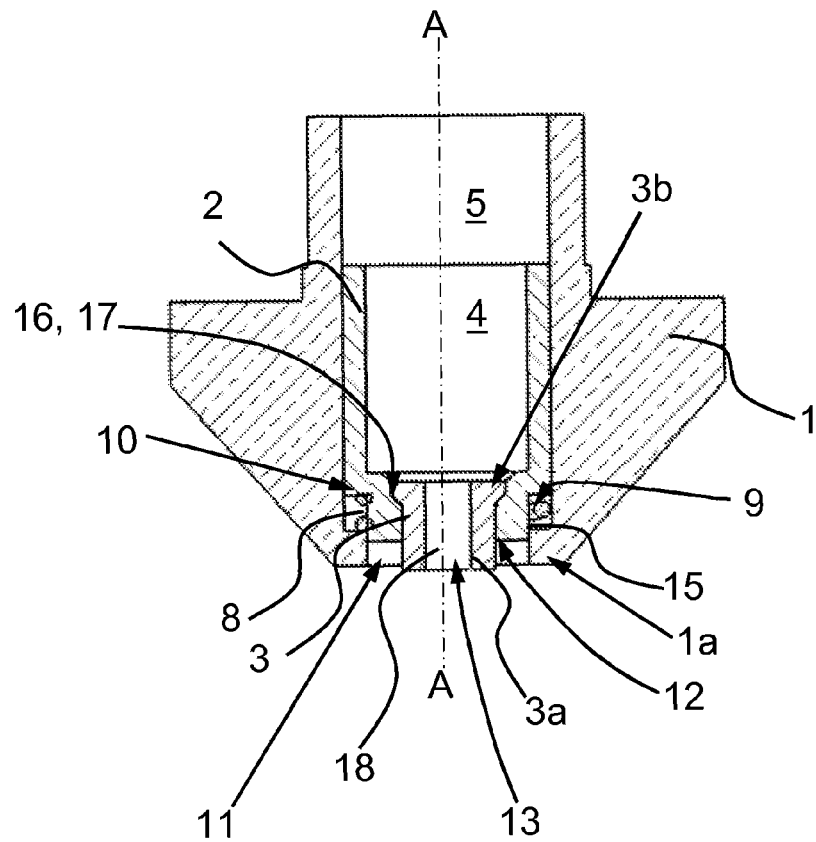

FIGS. 5A and 5B schematically show such a translational movement of the movable element 2 in the first housing 5, this movement simultaneously engendering a translational movement of the insert 3 in the direction of the first outlet orifice 11 of the nozzle body 1.

In particular, FIG. 5A schematically shows a nozzle according to the invention comprising a movable element 2 retracted into the first housing 5 and an insert 3 the front portion 3a of which is almost completely retracted into the first housing 5. FIG. 5B schematically shows the effect of a gaseous pressure exerted on the movable element 2, the latter moving until the front portion 3a protrudes out of the first housing 5.

In the context of the invention, an elastic element 8 is arranged in the first axial housing 5, between the nozzle body 1 and the movable element 2. The elastic element 8 exerts an elastic return force on the movable element 2 tending to oppose the translational movement in the axial housing 5 in the direction of the first outlet orifice 11.

Thus, at the end of the cutting, when the gas is cut off and the gaseous pressure ceases to be exerted on the movable element 2 and/or on the insert 3, the latter may be returned to its rest position, i.e. until the skirt 6 of the insert 3 has retracted into the first housing 5.

The elastic element 8 thus allows effects causing wear of the skirt 6 to be limited during phases of piercing of the sheet, which generally precede the cutting phases. Specifically, this piercing is most often carried out under low gas pressures, typically lower than 4 bar. The elastic element then exerts enough of a return force for the skirt 6 to retract completely or almost completely into the housing 5, and it is thus protected from molten-metal spatter generated by the piercing.

The elastic element 8 also makes it easier to rapidly move the cutting head small distances over the sheet, without cutting gas or beam, since the gaseous pressure then ceases to be exerted on the movable element and the skirt 6 retracts into the housing 5. Only the skirt 6 is withdrawn and it is not necessary to raise the focusing head supporting the nozzle.

Furthermore, the elastic element 8 makes it possible to limit the pressure exerted by the movable element 2 on the part to be cut when said element is moved in the direction of the part under the effect of the cutting gas. More precisely, the return force of the elastic element 8 is advantageously dimensioned so as to maintain the movable element 2 in contact with the part to be cut while limiting the pressure that said element exerts on the sheet, in order to minimize largely, or even eliminate, any risk of deforming the sheet in which the part is cut, of scratching the surface of the sheet, and of dragging the sheet.

Optionally, at least one sealing element (not shown) is arranged between the nozzle body 1 and the movable element 2, in particular one or more O-rings, thereby making it possible to create a seal between the nozzle body 1 and the movable element 2. Preferably, said at least one sealing element is arranged in a peripheral groove (not shown) produced in the external peripheral wall of the movable element 2.

Advantageously, the first axial housing 5 of the nozzle body 1 comprises a first internal shoulder 9, preferably located in the bottom 15 of said first housing 5, and the external peripheral wall of the movable element 2 comprises a first abutment 10 arranged facing said first internal shoulder 9. The elastic element 8 is positioned between the first shoulder 9 and the first abutment 10.

The insert 3 comprises an external peripheral wall that may have various shapes: for example being cylindrical or generally cylindrical, with a back portion 3b comprising a second abutment 17 having a surface that is flat, i.e. a surface perpendicular to the axis AA, or oblique. The cross section of the external peripheral wall of the insert 3 may therefore have dimensions that vary along the axis AA.

In any case, the dimensions of the cross section of the external peripheral wall of the insert 3 are comprised between 0.2 and 50 mm and preferably between 1 and 6 mm. The height of the insert 3, i.e. its dimension along the axis AA, is comprised between 0.1 and 100 mm and preferably between 1 and 10 mm.

Advantageously, the maximum cross section of the external peripheral wall of the insert 3 is smaller than the minimum cross section of the first axial housing 5 of the nozzle body 1.

In other words, in the embodiments illustrated in FIGS. 4, 5A and 5B, the dimensions of the cross section of the external peripheral wall of the insert 3 remain, along the axis AA, smaller than those of the cross section of the first axial housing 5 level with the narrowing forming the first internal shoulder 9.

Specifically, it has been observed in practice that operation of the capacitive sensor may be disrupted if a surface of the external peripheral wall of the insert 3 is located facing the surface of the first internal shoulder 9 provided in the first axial housing 5. This is especially due to the fact that these surfaces are formed from electrically conductive materials and that the distance that separates them may vary substantially during the cutting process.

The nozzle of the invention has the advantage of allowing the insert 3 to be dimensioned so that the surfaces of its external peripheral wall do not intersect the cross section of the bottom 15, while allowing the abutment 10 of the movable element 2 to be arranged facing the first shoulder 9. Thus, with the nozzle of the invention no electrically conductive surfaces are located facing the surface of the first shoulder 9.

Optionally, the front portion 3a of the insert 3 may comprise a downstream end portion the outside diameter of which gradually decreases in the direction of the third outlet orifice 13. Thus, the front portion 2a is shaped so as to facilitate its passage over reliefs or obstacles present on the surface of the sheet.

The expression "downstream end portion" is understood to mean a segment of the front portion 3a located at the end of said front portion, i.e. facing the upper surface of the sheet to be cut.

The downstream end portion is thus shaped to pass over a step or obstacle without a or with a greatly decreased shock on the skirt 6, and without or else with very little decrease in the velocity of the nozzle. The presence of a sharp edge on the end of the front portion 3a is also avoided, thereby making the movement of the skirt 6 more flexible and allowing it to follow variations in levels that may be present on the surface of the sheet to be cut, thereby making it even easier to implement industrially.

In the context of the invention, the downstream end portion may comprise at least one chamfer 19 making an angle $\alpha$ comprised between 0.1 and 80° and preferably between 10 and 45° to the front face 1a of the nozzle body 1.

Alternatively, the external profile of the downstream end portion may comprise at least one curvilinear segment, preferably at least one convex segment. The radius of curvature of the at least one convex segment is typically comprised between 0.1 and 2 mm.

As may be seen in FIGS. 4 and 5, the nozzle of the invention is of standard bulk, i.e. its bulk is no larger than that of a conventional nozzle, which is advantageous and compatible with imbricated cutting, i.e. of parts in a given sheet with very little space separating the various parts.

In addition, the nozzle of the invention has the major advantage of having an increased lifetime while being compatible with capacitive sensor systems.

As is known per se, the nozzle body 1, made of an electrically conductive material, is electrically connected to the capacitive sensor system with which the focusing head is equipped when said body is assembled with the head. In the context of the invention, it is the insert 3 and no longer the movable element 2 that, under the pressure of the gas, makes contact with the sheet 30 to be cut in order to limit gas leaks. The operation of the capacitive sensor is not disrupted because the nozzle body 1 and the insert 3 are electrically insulated by way of the movable element 2. The capacitive sensor is thus capable of measuring one or more values of the electrical capacitance between the front face 1a of the nozzle body 1 and the upper surface of the sheet to be cut, and of adjusting, based on the measured values, the distance between the front face 1a of the nozzle body 1 and the upper surface of the sheet. Thus, it can detect any variation in this distance and therefore correct the position of the focusing head.

In fact, the movable element 2 of the nozzle according to the invention is able to move between a plurality of positions, comprising at least:

a rest position in which the front portion 3a of the insert 3 is completely or almost completely retracted into the first axial housing 5 of the nozzle body 1, as illustrated in FIG. 6B; and a working position in which the skirt of the front portion 3a of the insert 3 completely or almost completely protrudes out of the first axial housing 5 of the nozzle body 1, through the first outlet orifice 11, and makes contact with the part to be cut, as illustrated in FIG. 6A.

Of course, the movable element 2 may occupy intermediate positions in which the skirt 6 only partially protrudes out of the axial housing 5 of the nozzle body 1. These intermediate positions may especially depend on the pressure exerted by the gas on the movable element 2.

The solution of the present invention thus leads to a nozzle having a movable element, which nozzle is more robust, has a longer lifetime and is easier to implement industrially than a nozzle according to document FR 1 154 224.

EXAMPLES

In order to demonstrate the effectiveness of the nozzle according to the invention relative to a standard nozzle, i.e. a conventional nozzle without a movable element, and therefore the advantage of using a skirt mounted on a movable element to force the gas into the cutting kerf, comparative trials were carried out using a cutting apparatus employing a $CO_2$ laser generator to generate a laser beam that was directed to a laser focusing head comprising focusing optical elements, namely lenses.

The laser focusing head was equipped either with a standard nozzle having an outlet orifice of 1.8 mm diameter, or with a nozzle according to FIG. 4A having a cylindrical movable skirt, the axial passage of the nozzle body of the latter nozzle having an outlet orifice of 1.8 mm diameter and a cylindrical profile. Furthermore, the external profile of the movable skirt comprised a chamfer making an angle α of about 30° to the horizontal, i.e. to the front face of the nozzle body.

The assistance gas used was nitrogen.

The sheet to be cut was a 5 mm-thick sheet of 304L stainless steel.

The laser beam had a power of 4 kW and the cutting speed was 2.6 m/min.

The results obtained demonstrated that:

with the standard nozzle, a gas pressure of 14 bars is not enough to obtain a quality cut. Specifically, at 14 bars, the edges of the cut contain many attached burrs. This demonstrates that the evacuation of the molten metal has not taken place as it should because of an insufficient action of the gas on the molten metal needing to be expelled. In order to remove these burrs, a pressure of 16 bars was required.

with the nozzle of the invention, trials carried out at pressures ranging between 1 and 5 bars led to good-quality cuts, i.e. having cut edges devoid of attached burrs. The skirt of the nozzle allowed gas to be channeled into the kerf and the molten metal to be effectively expelled. Furthermore, the nozzle permitted operation of the capacitive sensor and it was possible to keep the distance between the front face of the nozzle body and the upper surface of the sheet constant throughout the cutting process.

These trials clearly demonstrate the effectiveness of a nozzle according to the invention, which allows the gas pressures implemented to be considerably decreased relative to a standard nozzle, under otherwise identical conditions, and therefore gas consumption to also be decreased.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A laser nozzle comprising:
   a nozzle body comprising a first axial housing,
   a movable element comprising a second axial housing, said movable element being arranged in the first axial housing,
   an elastic element arranged in the first axial housing between the nozzle body and the movable element, and
   an insert comprising an axial passage and a front portion forming a skirt that protrudes out of the second axial housing, said insert being arranged in the second axial housing of the movable element,
   wherein the insert is formed from an electrically conductive material and the movable element is formed from an electrically insulating material.

2. The nozzle of claim 1, wherein the second axial housing of the movable element comprises a second outlet orifice located in a front face of the movable element, the insert being arranged in the second axial housing so that the front portion forming a skirt protrudes out of said second axial housing through the second outlet orifice.

3. The nozzle of claim 1, wherein the first axial housing of the nozzle body comprises a first outlet orifice located in a front face of the nozzle body, the movable element being able to move translationally in the first axial housing of the nozzle body until the front portion forming a skirt of the insert protrudes out of said first axial housing through the first outlet orifice of the front face of the nozzle body.

4. The nozzle of claim 1 wherein the elastic element exerts an elastic return force on the movable element tending to oppose the translational movement of the movable element in the first axial housing in the direction of the first outlet orifice.

5. The nozzle of claim 1, wherein the first axial housing of the nozzle body comprises an inlet orifice allowing said first axial passage to be supplied with assistance gas.

6. The nozzle of claim 1, wherein the movable element is able and designed to move translationally in the first axial housing in the direction of the first outlet orifice under the effect of a gaseous pressure exerted on said movable element and/or said insert.

7. The nozzle of claim 1, wherein the nozzle body, the movable element and the insert are axisymmetric parts arranged coaxially to one another.

8. The nozzle of claim 1, wherein the insert comprises an external peripheral wall the maximum section of which is smaller than the minimum section of the first axial housing.

9. The nozzle of claim 1, wherein the second axial housing comprises at least one second internal shoulder, and the external peripheral wall of the insert furthermore comprises a back portion comprising a second abutment arranged facing said second internal shoulder.

10. The nozzle of claim 1, wherein the movable element is able to move between a plurality of positions comprising:
   a rest position in which the front portion of the insert is completely or almost completely retracted into the first axial housing of the nozzle body: and a working position in which the skirt of the front portion of the insert completely or almost completely protrudes out of the first axial housing of the nozzle body, through the first outlet orifice.

11. A laser focusing head comprising at least one focusing optical element, further comprising a laser nozzle as claimed in claim 1.

12. A laser apparatus comprising a laser generator, a laser focusing head and a laser beam guiding device connected to said laser generator and to said laser focusing head, wherein the laser focusing head is as claimed in claim 10.

13. The laser apparatus as claimed in claim 12, further comprising a gas source and at least one gas supply line fluidically connecting the focusing head and the gas source, the laser nozzle being fluidically connected to the focusing head, and the movable element moving translationally in the first axial housing of the nozzle body when the gas source supplies the focusing head and the laser nozzle with gas.

* * * * *